(12) United States Patent
Sonnenberg

(10) Patent No.: US 10,359,304 B2
(45) Date of Patent: Jul. 23, 2019

(54) ULTRASONIC METER FOR RECORDING A THROUGH-FLOW RATE OF A FLUID

(71) Applicant: DIEHL METERING GMBH, Ansbach (DE)

(72) Inventor: Hans-Michael Sonnenberg, Ansbach (DE)

(73) Assignee: Diehl Metering GmbH, Ansbach (DE)

( * ) Notice: Subject to any disclaimer, the term of this patent is extended or adjusted under 35 U.S.C. 154(b) by 92 days.

(21) Appl. No.: 15/637,434

(22) Filed: Jun. 29, 2017

(65) Prior Publication Data

US 2018/0010940 A1 Jan. 11, 2018

(30) Foreign Application Priority Data

Jul. 6, 2016 (DE) .................. 10 2016 008 302

(51) Int. Cl.
| | |
|---|---|
| *G01F 1/66* | (2006.01) |
| *G01F 15/02* | (2006.01) |
| *G01F 25/00* | (2006.01) |
| *G01F 1/86* | (2006.01) |

(52) U.S. Cl.
CPC .............. *G01F 1/66* (2013.01); *G01F 1/662* (2013.01); *G01F 15/028* (2013.01); *G01F 25/0007* (2013.01); *G01F 1/86* (2013.01); *G01F 15/024* (2013.01)

(58) Field of Classification Search
CPC ........ G01F 15/024; G01F 15/028; G01F 1/66; G01F 1/662; G01F 1/86; G01F 25/0007
See application file for complete search history.

(56) References Cited

U.S. PATENT DOCUMENTS

| | | | | |
|---|---|---|---|---|
| 5,728,948 A | * | 3/1998 | Bignell ................ | G01F 1/662 |
| | | | | 73/861.28 |
| 7,360,447 B2 | | 4/2008 | Kroemer et al. | |
| 8,893,559 B2 | * | 11/2014 | Drachmann ........... | G01F 1/662 |
| | | | | 73/861.18 |
| 8,904,881 B2 | | 12/2014 | Sonnenberg et al. | |

(Continued)

FOREIGN PATENT DOCUMENTS

| | | |
|---|---|---|
| DE | 102005063313 A1 | 10/2006 |
| DE | 102010033858 A1 | 1/2012 |

(Continued)

*Primary Examiner* — Francis C Gray
(74) *Attorney, Agent, or Firm* — Laurence A. Greenberg; Werner H. Stemer; Ralph E. Locher

(57) ABSTRACT

An ultrasonic meter for recording a through-flow rate of a fluid has a fluid inlet, a fluid outlet, and a flow channel connecting the inlet to the outlet. The flow channel has a measurement region which extends in a straight line in a flow direction. Between the measurement region and the fluid outlet, there is arranged a reflection element which is flowed around by the fluid and by which an ultrasonic signal is reflected into the measurement region. Between the measurement region and the reflection element, there is arranged a changeover region of the flow channel. In the changeover region a spacing between a central straight line of the measurement region and the side wall enlarges. The changeover region has, in the circumferential direction of the flow channel, several circumferential sections in which the enlargement of the spacing between the central straight line and the side wall takes place.

10 Claims, 4 Drawing Sheets

(56) References Cited

U.S. PATENT DOCUMENTS

| | | | |
|---|---|---|---|
| 9,297,681 B2* | 3/2016 | Speidel | G01F 1/66 |
| 2015/0033873 A1* | 2/2015 | Drachmann | G01F 1/662 |
| | | | 73/861.18 |
| 2017/0211956 A1 | 7/2017 | Drachmann | |

FOREIGN PATENT DOCUMENTS

| | | |
|---|---|---|
| EP | 1701140 A1 | 9/2006 |
| EP | 1798528 A1 | 6/2007 |
| EP | 1978337 A1 | 10/2008 |
| EP | 1995570 A1 | 11/2008 |
| EP | 2270439 A1 | 1/2011 |
| JP | 2003114142 A  * | 4/2003 |
| WO | 2016012024 A1 | 1/2016 |

* cited by examiner

ULTRASONIC METER FOR RECORDING A THROUGH-FLOW RATE OF A FLUID

CROSS-REFERENCE TO RELATED APPLICATION

This application claims the priority, under 35 U.S.C. § 119, of German application DE 10 2016 008 302.6, filed Jul. 6, 2016; the prior application is herewith incorporated by reference in its entirety.

BACKGROUND OF THE INVENTION

Field of the Invention

The invention relates to an ultrasonic meter for recording a through-flow rate of a fluid, having a fluid inlet, a fluid outlet, and a flow channel which connects the fluid inlet to the fluid outlet. The flow channel has a measurement region which extends in a straight line in a flow direction. Between the measurement region and the fluid outlet, there is arranged a reflection element which can be flowed around by the fluid and by way of which an ultrasonic signal from an ultrasonic transducer, which is arranged on a side wall delimiting the flow cross section of the flow channel, can be reflected into the measurement region or vice versa. Between the measurement region and the reflection element, there is arranged a changeover region of the flow channel, in which changeover region a spacing between a central straight line, running in the flow direction, of the measurement region and a side wall enlarges in a stepwise or continuous manner.

In ultrasonic meters for recording a through-flow rate, for reliable through-flow recording, it can be particularly favorable to guide the fluid in a straight line through a measurement region and to use ultrasonic transducers which are arranged in the side wall and emit or receive ultrasonic signals, for example, substantially perpendicularly to the flow direction of the fluid. For speed measurement, however, the corresponding ultrasonic signals should be guided through the measurement region in a substantially parallel manner with respect to the flow direction. Reflection elements are therefore typically provided on both sides of the measurement region, in order to deflect corresponding ultrasonic signals.

A disadvantage here is that the reflection elements have to be flowed around by the flow, which can lead to flow swirls and disturbances, which do not form in a uniform manner over the entire through-flow region. As a result, the measurement signal of the ultrasonic meter can potentially be distorted. Here, the flow around the fluid-outlet-side reflection element can be particularly problematic. Upon striking the reflection element, the flow is divided, wherein partial flows can be guided past above, below and to the side of the reflection element. That partial flow which is guided above the reflection element, that is to say between the reflection element and the ultrasonic transducer, influences the ultrasonic signals sent or received by the ultrasonic transducer. The other partial flows do not do this. The resulting measurement signal is therefore influenced in dependence on the flow division.

If the division of the partial flows were independent of flow rate, or if it were to vary slowly and continuously with the flow rate, a corresponding variation during electronic measurement data processing could be compensated by a corresponding adaptation of the characteristic curve. If a measurement region in which the flow cross section is constricted is brought up relatively close to a reflection element, backing-up effects can occur, however, which, even in the case of relatively small through-flow changes, can lead to a sudden change in the flow division. This can lead to kinks in the characteristic curve of the ultrasonic meter, and there kinks can lead for example to measurement errors of up to 3%. Corresponding effects cannot be electronically compensated in a reliable manner, since the transition points between different flow divisions can change for example in dependence on temperature or ageing.

SUMMARY OF THE INVENTION

The invention is therefore based on the object of specifying an ultrasonic meter which allows improved measurement accuracy compared therewith, in that, in particular, flow changes in the ultrasonic meter that suddenly occur are prevented or reduced.

The object is achieved according to the invention by an ultrasonic meter of the type initially mentioned, wherein the changeover region has, in the circumferential direction of the flow channel, several circumferential sections in which the enlargement of the spacing between the central straight line and the side wall takes place or begins at expansion positions which, as viewed in the flow direction, differ from one another.

Compared to a conventional procedure in which, upstream of the reflection element, a flow channel opens in a stepwise or continuous manner over the entire circumference of the flow channel, the invention proposes to beginning or performing the opening of the flow cross section in various circumferential sections of the circumference at various positions in the flow direction. Since the flow channel is flowed through axially, the enlargement in spacing for the circumferential sections takes place at different axial positions. The expansion positions are thus axially spaced apart from one another and, for the individual circumferential sections, the expansion of the flow cross section takes place or begins in planes which are axially spaced apart from one another. The spacing between the central straight line and the side wall changes in each case in the radial direction of the flow channel. This makes it possible firstly to guide the fluid flow up to a point which is situated relatively close to the reflection element, at least in partial regions of the circumference of the flow, such that uncontrollable flow changes, which can occur in the case of a flow in the form of a free jet, can be avoided. On the other hand, as a result of an expansion of the flow cross section which has already taken place beforehand in some circumferential sections, it is possible to ensure that the fluid flow is able to flow around the reflection element better, whereby backing-up effects can be suppressed. This advantageously leads at the same time to a small pressure drop at the measurement section. Moreover, by way of a corresponding selection of the circumferential sections and the expansion positions, it is possible to at least partially break the symmetry of the fluid flow, whereby a substantially stable flow division at the reflection element can be achieved.

The changeover section can be formed in such a manner or the expansion positions of the several sub-sections can be selected in such a manner that a backing-up of the partial streams flowing around the reflection element and resultant sudden flow transitions can be reduced or prevented. The ultrasonic meter is advantageously formed in such a manner that a flow guided to the reflection element is divided into several partial flows which are guided past different sides of the reflection element. The changeover region is formed in such a manner that the division of an incoming fluid flow into the partial flows in an operating region of the ultrasonic meter that is predefined with respect to the flow speed is substantially independent of the flow speed of the fluid, or is formed in such a manner that the division changes in a continuous manner over at least 10, 20, 30 or 50% of the operating region.

The fluid can be a liquid, in particular water. It is, however, also possible for the fluid to be a gas. The reflection element can be an element which is in particular planar and which is positioned at an angle relative to the flow direction. The reflection in the measurement region or from the measurement region can take place in a substantially parallel manner with respect to the flow direction. Between the fluid inlet and the measurement section, it is possible to provide a further reflection element, by way of which preferably an ultrasonic signal from a further ultrasonic transducer arranged on the side wall of the flow channel can be reflected into the measurement region or vice versa. For the through-flow measurement, the ultrasonic signal can be emitted by the ultrasonic transducer and received by the further ultrasonic transducer or vice versa.

The flow channel can be formed at least in sections by a housing of the ultrasonic meter. It is possible for the flow channel or the side walls delimiting the flow cross section of the flow channel to be formed from different components in different sections of the flow channel. For example, a fluid-inlet-side and a fluid-outlet-side section of the flow channel can be formed by a housing of the ultrasonic meter, in which a measurement tube is accommodated which forms the side walls in the measurement region. It is also possible for, in regions of the flow channel, in particular in the changeover region, different sections of the side wall in the circumferential direction of the flow channel to be formed by different components, for example by the housing and the measurement tube.

The flow channel or the housing can preferably be tubular. The measurement tube and/or the fluid channel can have a substantially circular cross-sectional area. Other forms are also possible, however, for example with side walls which undulate in the circumferential direction.

The central straight line can be defined in such a manner that it runs through the geometric center of the flow cross section in the measurement region. The flow cross section can be constant in the measurement region or can narrow through a slightly conical form in the flow direction in such a manner that the geometric center of the flow section remains constant. The narrowing can serve for the continuous acceleration of the fluid, as a result of which a flow can be stabilized.

The changeover region can be formed as a step diffuser in which the flow cross section of the flow channel increases in size in several steps which follow one another in the flow direction. The individual steps are formed by the enlargement of the spacing between the central straight line and the side wall in one circumferential section in each case or in part of the sub-sections at a respective one of the expansion positions. The part of the sub-sections preferably does not comprise all the sub-sections.

The side wall in the measurement region can be formed by a measurement tube, the fluid-outlet-side end of which opens into an outlet tube in which the reflection element is arranged. The side wall of the measurement tube ends in the circumferential sections of the changeover region at the respective expansion position, whereby the flow cross section in the individual circumferential sections is in each case delimited upstream of the expansion position by the side wall of the measurement tube and downstream of the expansion position by the side wall of the outlet tube. The outlet tube can preferably be formed by a housing of the ultrasonic meter, which housing can also form an inlet tube in which the further reflection element is arranged, and/or the fluid inlet and/or the fluid outlet. Forming the measurement region by way of a measurement tube can simplify the production of the ultrasonic meter, in particular if the housing and/or the measurement tube are produced by plastic injection molding.

In the ultrasonic meter according to the invention, it is possible for an outer surface of the fluid-outlet-side end of the measurement tube to be spaced apart from an inner surface of the outlet tube. In this case, the measurement tube ends freely in the outlet tube. As a result, back-flushing of the measurement tube or the outer wall is made possible.

The expansion position of an upper circumferential section that is arranged on the same side of the flow channel as the ultrasonic transducer can be situated downstream, in the flow direction, of the expansion position of a lower circumferential section that is arranged opposite the upper circumferential section, and/or of at least one lateral circumferential section that is arranged between the upper and the lower circumferential section. This results in the expansion of the flow section, in particular by an ending of the measurement tube, taking place last on that side of the flow channel which faces the ultrasonic transducer, whereby that part of the fluid flow which is guided through between the reflection element and the ultrasonic transducer and thus influences the measurement can be guided up to an expansion position situated close to the reflection element. Consequently, an easily controllable flow can be achieved with the avoidance of free jet effects, as a result of which the robustness of the measurement can be improved. The designations of the sub-sections as upper, lower and lateral circumferential section serve only for the designation of the position of the corresponding circumferential section with respect to the ultrasonic transducer and are independent of a spatial arrangement of the ultrasonic meter.

The change of the expansion position in the circumferential direction between the upper and the lateral and/or between the lateral and the lower circumferential section can take place in an abrupt or continuous manner via a changeover section arranged between the respective circumferential sections. A continuous changeover can in particular be a linear changeover, which results, in the changeover region, in a sawtooth-like geometry in the circumferential direction. If the spacing changes, as explained above, are achieved by a respective ending of a measurement tube at the expansion position, the fluid-outlet-side end of the measurement tube can, have a sawtooth-like geometry at least in sections.

The expansion position of exactly one lateral circumferential section can be situated upstream of the expansion position of the upper circumferential section. For example, as viewed in the flow direction, the flow channel can firstly expand solely towards the left or towards the right or a measurement tube can have a recess solely on the left or on the right, such that, starting from the expansion position at which the recess begins, the side wall is formed by a housing or the like. As a result, an asymmetrical opening of the flow channel is achieved, whereby sudden flow displacements can be counteracted.

Alternatively, it is possible for the expansion position of two lateral circumferential sections positioned opposite one another to be situated upstream of the expansion position of the upper circumferential section, wherein the expansion positions and/or wherein respective lengths of an extent in the circumferential direction of the lateral circumferential sections differ from one another. The lateral circumferential sections are thus formed asymmetrically with respect to one another. Consequently, an asymmetrical opening of the flow channel and therefore an asymmetrical opening in the region of the reflection element is achieved, this counteracting sudden flow displacements. A corresponding asymmetry can be achieved for example in that two laterally opposite recesses which differ from one another in their width in the circumferential direction, and/or in their depth in the flow direction are provided in a measurement tube.

In a further alternative embodiment, it is possible for the expansion positions of the lateral and of the lower circumferential section to be the same. For example, it is possible to provide a measurement tube which forms the measurement region and which is extended, i.e. has for example a type of tab, in the upper region, that is to say on the side facing the ultrasonic transducer. The formation of the ultrasonic meter allows a relatively early opening of the flow channel, as a result of which flow resistance can be reduced and both lateral backing-up effects and backing-up effects below the reflection element can be avoided. At the same time, for that flow part which is guided through between the reflection element and the ultrasonic transducer and which influences the measurement, flow guidance through the tab or the later expansion in the upper circumferential section is achieved, whereby any influence on the flow by free-jet effects is reduced.

It is possible for at least one web which extends in the flow direction and which extends beyond the respective expansion position as an extension of the side wall of the measurement region to be arranged in at least one of the circumferential sections. Here, a side of the web which faces the central straight line can have the same spacing from the central straight line as the side wall in the respective circumferential section upstream of the expansion position or the web can continue the side wall in a straight line beyond the expansion position. In the case of a measurement tube being used for the formation of the measurement region, this can be realized for example in that at least one web projects beyond the tube end in the circumferential section. For example, a recess in the lateral or lower circumferential section can have at least one web. The web can extend up to the longest section of the tube, in particular in the upper circumferential section, but it can also be shorter. Corresponding webs can swirl the flow in the changeover region and thus counteract sudden flow transitions.

The reflection element can be held via at least one retaining web at a circumferential section of the changeover region, the expansion position of which in the flow direction is situated equally as far as, or further downstream than, the expansion positions of all further circumferential sections of the changeover region, or can be held at a section, situated adjacently downstream of the circumferential section, of the side wall of the flow channel. In particular, it is possible for at least one or it is preferably possible for two retaining webs to be provided, in each case in the upper and/or in the lower circumferential section. This allows selective guidance of the flow in the region of the retaining webs, whereby said webs can be used for selectively swirling the flow, depending on the specific arrangement, or corresponding swirling can be reduced.

The flow cross section in the measurement region can continuously decrease in size in the flow direction, in order to continuously increase the flow speed of the fluid. Such a continuous acceleration of the fluid makes it possible to stabilize the flow and consequently sudden flow transitions can be suppressed. The wall incline for the reduction of the flow cross sections can lie between 0.5°, in particular 0.7°, and 2°, in particular 1°. In the case of a typical length of the measurement region of 50-60 mm, the spacing of the respective side wall relative to the central straight line changes by approximately 0.5-2 mm. The above described narrowing of the flow cross section can, in particular if a substantially conical form of the measurement region or of the measurement tube is used, also facilitate demolding of the components, in particular the measurement tube, forming the measurement region, when injection molding is used for the purpose of production.

In the ultrasonic meter according to the invention, it is possible for the side wall, at least in the measurement region, to be formed in an undulating manner in the circumferential direction. The flow cross section in the measurement region therefore has pockets, that is to say the cross section does not form a convex surface. An undulation of the side wall breaks a rotational symmetry of the flow, and this can help to suppress sudden transitions of the flow guidance. In the case of an undulating side wall, the spacing between the side wall and the central straight line varies in the circumferential direction. The spacing can preferably vary in a periodic manner between a maximum and a minimum.

Other features which are considered as characteristic for the invention are set forth in the appended claims.

Although the invention is illustrated and described herein as embodied in an ultrasonic meter for recording a through-flow rate of a fluid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
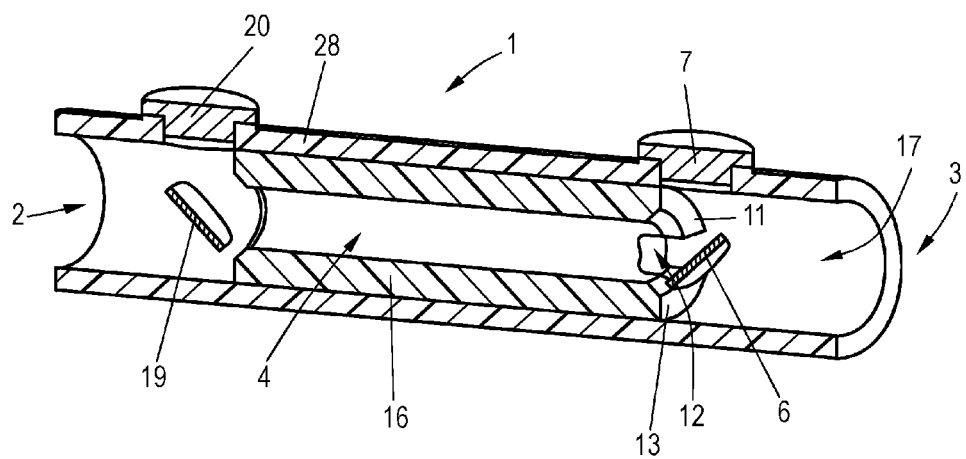
FIGS. 1 and 2 are diagrammatic, perspective and sectional views of an exemplary embodiment of an ultrasonic meter according to the invention.
Figure 2:
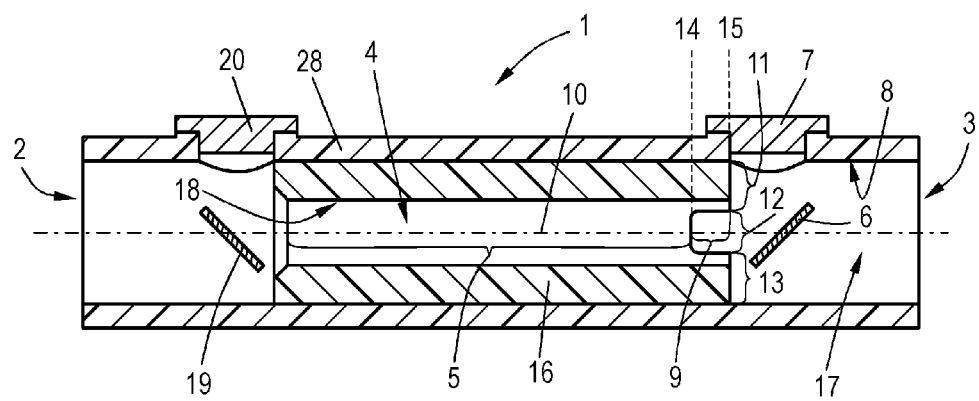

Referring now to the figures of the drawings in detail and first, particularly to FIGS. 1 and 2 thereof, there are shown sectional views of an ultrasonic meter 1 for recording a through-flow rate of a fluid. Here, both figures show the same section, wherein FIG. 1 shows an oblique view in order to illustrate the extent of the components of the ultrasonic meter 1 perpendicular to the plane of the drawing of FIG. 2.

The ultrasonic meter 1 has a fluid inlet 2, a fluid outlet 3, and a flow channel 4 which connects the fluid inlet 2 to the fluid outlet 3. The flow channel 4 contains a measurement region 5 which extends in a straight line in a flow direction in which the fluid is guided through the ultrasonic meter 1. Between the measurement region 5 and the fluid outlet 3 there is arranged a reflection element 6 which can be flowed around by the fluid and by way of which an ultrasonic signal from an ultrasonic transducer 7, which is arranged on a side wall 8, 18 delimiting the flow cross section of the flow channel 4, can be reflected into the measurement region 5 or vice versa. Provided on the fluid-inlet side is a further reflection element 19, by way of which an ultrasonic signal from or to the ultrasonic transducer 20 can be reflected. The speed of the fluid flowing through the measurement region 4 can be recorded, in that an ultrasonic signal is emitted by the further ultrasonic transducer 20 and is reflected via the further reflection element 19 into the measurement region 5 in a substantially parallel manner with respect to the flow direction. After passing through the measurement region 5, the signal is guided via the reflection element 6 to the ultrasonic transducer 7 and received there. A through-flow can be determined for example from the signal propagation time or from a frequency shift. Alternatively, it would be possible to emit the ultrasonic signal by way of the ultrasonic transducer 7 and to receive the signal by way of the further ultrasonic transducer 20.

In order to achieve relatively high flow speeds in the measurement region 5 and thus to improve the measurement quality of the through-flow measurement, the flow cross section in the measurement region 5 is narrowed. This is realized in the exemplary embodiment according to FIGS. 1 and 2 in that a measurement tube 16 is inserted into a housing 28 which is of tubular design and which, in the region of the fluid inlet 2 and of the fluid outlet 3, forms the side walls 8 delimiting the flow cross section of the flow channel 4. In the measurement region 5, the tube forms the side wall 18 delimiting the flow cross section of the flow channel 4. In the changeover regions 9, which are explained in more detail below, the side walls 8, 18 are formed in part by the measurement tube 16 and in part by the housing 28.

In the case of the measurement geometry shown, after passing through the measurement region 5, the fluid flow strikes the reflection element 6 and is divided into several partial flows which are guided past the various sides of the reflection element 6. That fraction of the flow which is guided over the reflection element 6, that is to say through between the reflection element 6 and the ultrasonic transducer 7, in this case influences the measurement of the flow speed and therefore of the through-flow, since the fraction is situated in the path of the ultrasonic signal. The other flow parts do not influence this measurement. Here, the problem can arise that, in the case of certain through-flow rates, sudden transitions of the flow division occur because of backing-up effects. In order to avoid this, the changeover region 9 is provided, which has, in the circumferential direction of the flow channel 4, several circumferential sections 11, 12, 13 in which an enlargement of the spacing between the central straight line 10 and the side wall 8, 18 takes place at different expansion positions 14, 15 which are spaced apart from one another in the axial direction. This is realized in that, in the measurement tube 16, a recess is provided in the circumferential section 12, that is to say, as viewed in the flow direction, in the left-hand side wall. The changeover region 9 is therefore formed as a step diffuser in which the flow cross section of the flow channel 4 increases in size in two steps which follow one another in the flow direction, wherein the individual steps are formed by an enlargement of the spacing between the central straight line 10 and the side wall 8, 18. The enlargement of the spacing takes place at the expansion position 14 for the circumferential section 12 and takes place at the expansion position 15 for the circumferential sections 11, 13. The change of the expansion position 14, 15 between the individual circumferential sections 11, 12, 13 takes place in an abrupt manner. Alternatively, a continuous change would be possible.

The provision of the recess in the measurement tube 16 in the circumferential section 12 results in the flow cross section being expanded in an asymmetrical manner, with the result that first the reflection element 6 can be easily flowed around. The flow is furthermore guided through the measurement tube 16 over wide regions of the circumference of the flow, that is to say free jet effects are avoided, and that second, due to the asymmetrical flow guidance, sudden transitions of the flow division for flowing around the reflection element 6 can be suppressed, whereby the sudden measurement value changes described above can be prevented.

Sometimes, it can be desirable to intensify this effect, in that the fluid is additionally swirled in the region of the circumferential section 12. This can be achieved for example in that the recess does not contain the whole respective circumferential section in the region, but that webs (not shown) of the measurement tube 16 remain, between which the fluid is guided through.

Depending on the specific requirements of the ultrasonic meter 1, the basic concept of expanding the flow cross section in different circumferential sections 11, 12, 13 at different expansion positions 14, 15 can be implemented in various variants of which some are explained below with reference to FIGS. 3-7. Here, items which correspond to one another are denoted by the same reference signs.

Figure 3:
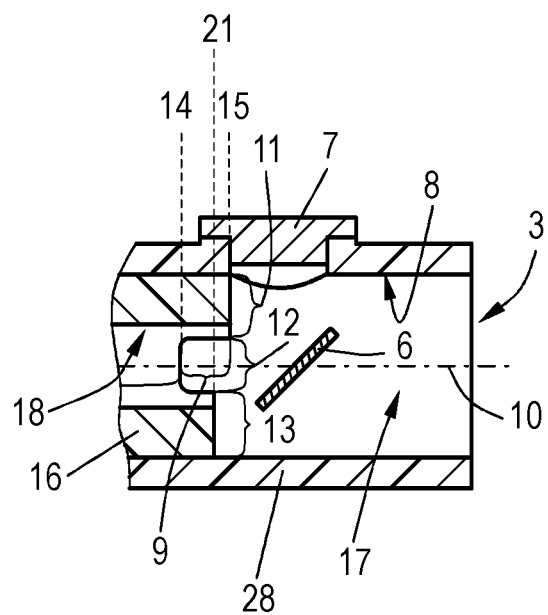
FIG. 3 is a detailed sectional view of a further exemplary embodiment of an ultrasonic meter according to the invention.

FIG. 3 shows a detail view of a further exemplary embodiment of an ultrasonic meter 1. Here, the essential difference from the ultrasonic meter shown in FIG. 1 is that not only the lateral circumferential section 12 but also the lower circumferential section 13 has an expansion position 14, 21 which is situated upstream of the expansion position 15 of the upper circumferential section 11. A step diffuser having an additional step is therefore realized, wherein the asymmetry of the flow guidance is further broken.

Figure 4:
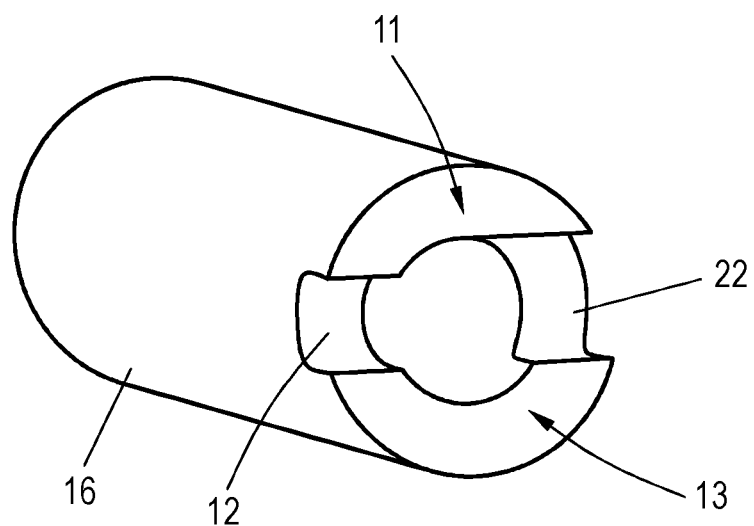
FIG. 4 is a diagrammatic, perspective view of a measurement tube of a further exemplary embodiment of the ultrasonic meter according to the invention.

FIG. 4 shows a measurement tube 16, the use of which in the ultrasonic meter 1 allows slightly different flow guidance to be achieved. In contrast to the measurement tube 16 shown in FIGS. 1 and 2, in the measurement tube 16 shown in FIG. 4, provision is made for a recess to be provided in each case in two lateral circumferential sections 12, 22 positioned opposite one another, that is to say for an expansion at an expansion position to take place which is situated upstream of the tube end in the upper and lower circumferential section 11, 13. The two-sided opening of the flow cross section allows the reflection element 6 to be flowed around with little flow resistance. In order nevertheless to achieve an asymmetrical flow division and therefore high stability with respect to sudden flow transitions, the recesses in the circumferential sections 12, 22 are formed differently, wherein the respective lengths of the extent of the lateral circumferential sections 12, 22 in the circumferential direction differ from one another. Alternatively or additionally, it would be possible to form the incisions at different depths, which is to say to use different expansion positions for the circumferential sections 12, 22.

Figure 5:
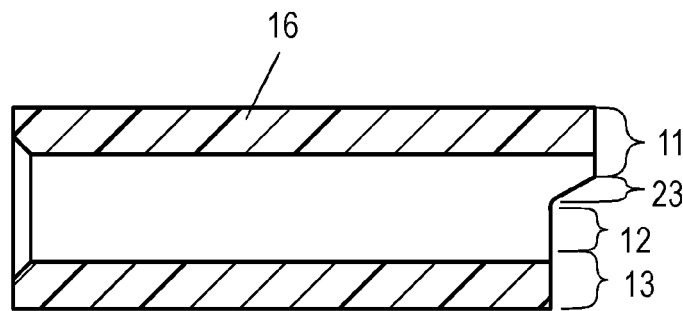
FIGS. 5-6 are sectional view of further embodiments of the measurement tubes of various further exemplary embodiments of the ultrasonic meter according to the invention.
Figure 6:
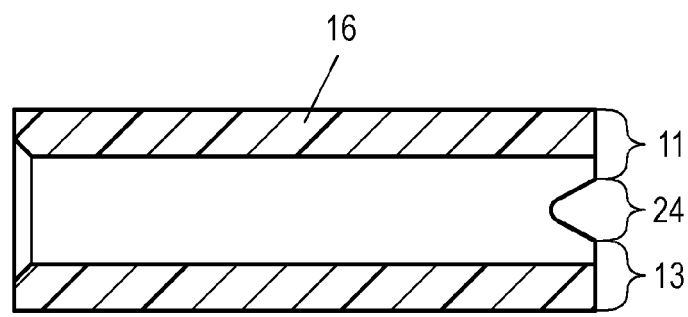

The measurement tube 16 shown in FIG. 5 ends at the same expansion position in the lateral and lower circumferential sections 12, 13, which expansion position is situated upstream of the expansion position in the upper circumferential section 11. As a result, the fraction of the flow which is particularly relevant for the measurement and which is largely guided through between the reflection element 6 and the ultrasonic transducer 7 is brought up close to the reflection element 6. At the same time, the early opening of the flow cross section in the circumferential sections 12, 13 allows an escape of the flow for the suppression of backing-up effects. The expansion position changes continuously between an upper circumferential section 11 and the lateral circumferential sections 12 via a changeover region 23.

In the exemplary embodiments shown up to now, apart from the changeover region 23, an expansion position which is constant over a circumferential section has been used in each case. This is not necessarily required. For example, the measurement tube 16 shown in FIG. 6 has a lateral circumferential section 24 with a conical cut-out, by way of which the expansion position changes continuously within the circumferential section 24.

Figure 7:
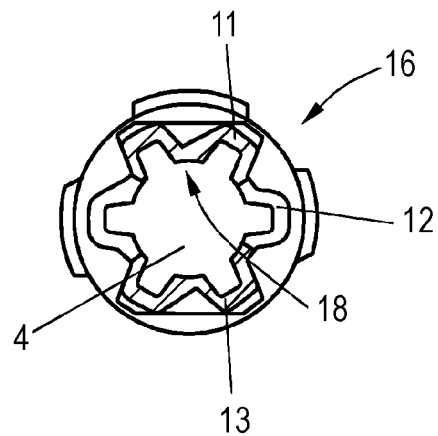
FIG. 7 is an end view of a measurement tube of a still further exemplary embodiment of the ultrasonic meter according to the invention.

The exemplary embodiments up to now are based on substantially cylindrical, sometimes slightly conically formed, measurement regions. This is not necessarily required, either. For example, FIG. 7 shows a view of the measurement tube 16, in a section close to the fluid-outlet-side end of a measurement tube 16, in which view the side wall 18 of the flow channel 4 is undulating in the measurement region 5. Consequently, a rotational symmetry of the flow section can be broken, and this can help to suppress sudden flow transitions. As can be seen from FIG. 7, on the fluid-outlet side, the measuring tube 16 ends in lateral circumferential sections 12 earlier than in upper and lower circumferential sections 11, 13, whereby different expansion positions are realized for the various circumferential sections 11, 12, 13.

Figure 8:
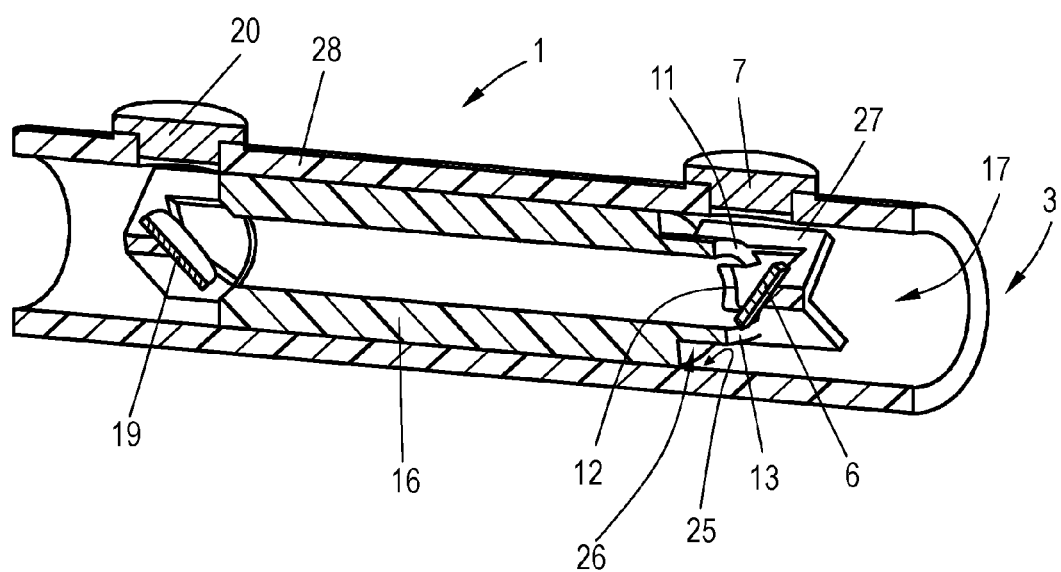
FIG. 8 is a sectional view of a further exemplary embodiment of the ultrasonic meter according to the invention.

FIG. 8 shows a further exemplary embodiment of the ultrasonic meter 1. This corresponds in many respects to the ultrasonic meter 1 illustrated in FIGS. 1 and 2, and for this reason only the differences are explained below. The measurement tube 16 is formed in such a manner that the wall thickness thereof decreases at a fluid-outlet-side end of the measurement tube 16, such that the outer surface 26 of the measurement tube 16 is spaced apart from an inner surface 25 of the housing 28 forming the outlet tube 17. As a result, back-flushing of the fluid-outlet-side end of the measurement tube 16 is allowed, and this can be advantageous from a technical viewpoint in terms of flow.

FIG. 8 also shows a specific possibility for fastening the reflection element 6. The reflection element 6 is held by retaining webs 27 which are arranged on an upper and lower circumferential section 11, 13 of the changeover region 9. The webs are therefore arranged at circumferential sections 11, 13 which have an expansion position which is situated furthest downstream, whereby the flowing fluid in the region of the retaining webs 27 can be brought up as close as possible to the reflection element 6. This allows robust control of the interaction of the guided flow with the retaining webs 27, which interaction can be adapted depending on the specific flow requirements.

The following is a summary list of reference numerals and the corresponding structure used in the above description of the invention:

1 Ultrasonic meter
2 Fluid inlet
3 Fluid outlet
4 Flow channel
5 Measurement region
6 Reflection element
7 Ultrasonic transducer
8 Side wall
9 Changeover region
10 Central straight line
11 Circumferential section
12 Circumferential section
13 Circumferential section
14 Expansion position
15 Expansion position
16 Measurement tube
17 Outlet tube
18 Side wall
19 Reflection element
20 Ultrasonic transducer
21 Expansion position
22 Circumferential section
23 Changeover section
24 Circumferential section
25 Inner surface
26 Outer surface
27 Retaining web
28 Housing

The invention claimed is:

1. An ultrasonic meter for recording a through-flow rate of a fluid, comprising:
a fluid inlet;
a fluid outlet;
a flow channel connecting said fluid inlet to said fluid outlet, said flow channel having a measurement region extending in a straight line in a flow direction, said flow channel having a side wall delimiting a flow cross section of said flow channel;
an ultrasonic transducer disposed on said side wall;
a reflection element disposed between said measurement region and said fluid outlet, said reflection element being flowed around by the fluid, and by way of said reflection element an ultrasonic signal from said ultrasonic transducer can be reflected into said measurement region;
between said measurement region and said reflection element, said flow channel having a changeover region, in said changeover region a spacing between a central straight line, running in the flow direction, of said measurement region and said side wall enlarges in a stepwise or continuous manner, said changeover region having, several circumferential sections in which an enlargement of the spacing between the central straight line and said side wall takes place or begins at expansion positions which, as viewed in the flow direction, differ from one another; and
said changeover region formed as a step diffuser in which said flow cross section of said flow channel increases in size in several steps which follow one another in the flow direction, wherein individual ones of said steps are formed by an enlargement of the spacing between the central straight line and said side wall in one circumferential section in each case or in part of sub-sections at a respective one of the expansion positions.

2. An ultrasonic meter for recording a through-flow rate of a fluid, comprising:
a fluid inlet;
a fluid outlet;
a flow channel connecting said fluid inlet to said fluid outlet, said flow channel having a measurement region extending in a straight line in a flow direction, said flow channel having a side wall delimiting a flow cross section of said flow channel, said flow channel having an outlet tube defining said side wall;

an ultrasonic transducer disposed on said side wall;

a reflection element disposed between said measurement region and said fluid outlet, said reflection element being flowed around by the fluid, and by way of said reflection element an ultrasonic signal from said ultrasonic transducer can be reflected into said measurement region;

between said measurement region and said reflection element, said flow channel having a changeover region, in said changeover region a spacing between a central straight line, running in the flow direction, of said measurement region and said side wall enlarges in a stepwise or continuous manner, said changeover region having several circumferential sections in which an enlargement of the spacing between the central straight line and said side wall takes place or begins at expansion positions which, as viewed in the flow direction, differ from one another;

said side wall in said measurement region is formed by a measurement tube, said measurement tube having a fluid-outlet-side end opening into said outlet tube in which said reflection element is disposed; and said measurement tube having a side wall ending in said circumferential sections of said changeover region at a respective one of the expansion positions, whereby a flow cross section in individual ones of said circumferential sections is in each case delimited upstream of the expansion position by said side wall of said measurement tube and downstream of the expansion position by said side wall of said outlet tube.

3. The ultrasonic meter according to claim 2, wherein said fluid-outlet-side end of said measurement tube has an outer surface spaced apart from an inner surface of said outlet tube.

4. An ultrasonic meter for recording a through-flow rate of a fluid, comprising:

a fluid inlet;

a fluid outlet;

a flow channel connecting said fluid inlet to said fluid outlet, said flow channel having a measurement region extending in a straight line in a flow direction, said flow channel having a side wall delimiting a flow cross section of said flow channel;

an ultrasonic transducer disposed on said side wall;

a reflection element disposed between said measurement region and said fluid outlet, said reflection element being flowed around by the fluid, and by way of said reflection element an ultrasonic signal from said ultrasonic transducer can be reflected into said measurement region;

between said measurement region and said reflection element, said flow channel having a changeover region, in said changeover region a spacing between a central straight line, running in the flow direction, of said measurement region and said side wall enlarges in a stepwise or continuous manner, said changeover region having several circumferential sections in which an enlargement of the spacing between the central straight line and said side wall takes place or begins at expansion positions which, as viewed in the flow direction, differ from one another;

said circumferential sections include an upper circumferential section, a lower circumferential section and lateral circumferential sections; and an expansion position of said upper circumferential section that is disposed on a same side of said flow channel as said ultrasonic transducer is situated downstream, in the flow direction, of an expansion position of said lower circumferential section that is disposed opposite said upper circumferential section, and/or of at least one of said lateral circumferential sections that is disposed between said upper circumferential section and said lower circumferential section.

5. The ultrasonic meter according to claim 4, wherein a change of the expansion position in the circumferential direction between said upper circumferential section and said one lateral circumferential section and/or between said one lateral circumferential section and said lower circumferential section takes place in an abrupt or continuous manner via a changeover section disposed between said respective circumferential sections.

6. The ultrasonic meter according to claim 4, wherein the expansion position of exactly one of said lateral circumferential sections is situated upstream of the expansion position of said upper circumferential section.

7. The ultrasonic meter according to claim 4, wherein the expansion position of two of said lateral circumferential sections positioned opposite one another is situated upstream of the expansion position of said upper circumferential section, wherein the expansion positions and/or wherein respective lengths of an extent in the circumferential direction of said lateral circumferential sections differ from one another.

8. The ultrasonic meter according to claim 4, wherein the expansion positions of said one lateral circumferential section and of said lower circumferential section are a same.

9. The ultrasonic meter according to claim 1, further comprising at least one web extending in the flow direction and extending beyond a respective expansion position as an extension of said side wall of said measurement region and is disposed in at least one of said circumferential sections.

10. The ultrasonic meter according to claim 1, further comprising at least one retaining web, said reflection element being held via said at least one retaining web at at least one of circumferential sections of said changeover region, the expansion position of which in the flow direction is situated equally as far as, or further downstream than, the expansion positions of all further ones of said circumferential sections of said changeover region, or is held at a section, situated adjacently downstream of a circumferential section, of said side wall of said flow channel.

* * * * *